US00RE44745E

(19) United States
(12) Reissued Patent
Tylicki et al.

(10) Patent Number: US RE44,745 E
(45) Date of Reissued Patent: Feb. 4, 2014

(54) SYSTEM AND METHOD FOR TRANSMITTING SIGNALS TO AN APPLIANCE

(71) Applicant: HealthCo LLC, Bowling Green, KY (US)

(72) Inventors: Scott B. Tylicki, Bowling Green, KY (US); Jimmy David Claiborne, Scottsville, KY (US); Timothy Gale Birdwell, Lafayette, TN (US)

(73) Assignee: HealthCo LLC, Bowling Green, KY (US)

(21) Appl. No.: 13/796,088

(22) Filed: Mar. 12, 2013

Related U.S. Patent Documents

Reissue of:
(64) Patent No.: 8,055,200
Issued: Nov. 8, 2011
Appl. No.: 12/132,295
Filed: Jun. 3, 2008

(51) Int. Cl.
*H04B 7/00* (2006.01)
*H04K 3/00* (2006.01)

(52) U.S. Cl.
USPC ..... 455/66.1; 455/128

(58) Field of Classification Search
USPC ..... 455/66.1, 128; 70/1, 432, 448; 340/328, 340/330, 392.1–393.3
See application file for complete search history.

(56) References Cited

U.S. PATENT DOCUMENTS

| | | | |
|---|---|---|---|
| 5,564,294 | A | 10/1996 | Chen |
| 5,881,864 | A | 3/1999 | Shelhorse |
| 8,055,200 | B2 | 11/2011 | Tylicki et al. |
| 2004/0085205 | A1 | 5/2004 | Yeh |
| 2007/0191075 | A1 | 8/2007 | Greene et al. |
| 2009/0298449 | A1 | 12/2009 | Tylicki et al. |
| 2009/0298450 | A1 | 12/2009 | Tylicki et al. |

*Primary Examiner* — Lee Nguyen
(74) *Attorney, Agent, or Firm* — Fitch Even Tabin & Flannery LLP

(57) ABSTRACT

A transmitter apparatus effective for activating a remotely situated appliance includes a radio frequency (RF) transmitter. The RF transmitter is configured to be mounted to a structural element of a building and configured to receive an actuation by a user to wirelessly transmit a signal. An antenna is coupled to the RF transmission circuitry and is arranged and configured to transmit the signal to a remotely situated appliance. The antenna is disposed within an opening in the structural element of the building and is of dimensions so as to extend at least partially through the opening. The antenna transmits the signal to the appliance without significant interference or absorption from the structural element of the building.

22 Claims, 2 Drawing Sheets

SYSTEM AND METHOD FOR TRANSMITTING SIGNALS TO AN APPLIANCE

Matter enclosed in heavy brackets [ ] appears in the original patent but forms no part of this reissue specification; matter printed in italics indicates the additions made by reissue.

CROSS REFERENCES TO RELATED APPLICATIONS

U.S. patent application Ser. No. 12/132,343, filed Jun. 3, 2008, titled SYSTEM AND METHOD FOR TRANSMITTING SIGNALS TO AN APPLIANCE the contents of which are incorporated herein by reference in their entirety.

FIELD OF THE INVENTION

The field of the invention relates to transmitters and, more specifically, to the actuation of appliances using transmitters.

BACKGROUND

Various types of appliances are utilized in today's homes and businesses. For example, doorbells, intercoms, lights, fans, alarm systems, and moveable barrier operators are only a few examples of such appliances in use today. To activate or control the operation of an appliance, some type of actuator is typically used. For instance, a switch may be actuated by a user in order to activate a light or a doorbell button may be pressed by a user to cause doorbell chimes associated with the button to sound. In some examples, the actuator may be hard-wired to the appliance. In other cases, the actuator may be associated with a wireless transmitter. When a wireless actuator is actuated, a radio frequency (RF) signal is formed and then transmitted via an antenna to the appliance. The appliance receives the RF signal and activates the appliance according to the RF signal.

Wireless systems have proved to be convenient for many users, for example, avoiding the need to re-wire existing systems. Unfortunately, wireless systems also have experienced various problems that often limited their use and/or effectiveness. More specifically, wireless systems are often attached to the exterior walls of buildings. The walls themselves are constructed of materials such as stucco (that include a metallic mesh), or are surrounded by steel or aluminum siding all of which interfere with and/or absorb wireless signals intended to be sent from the wireless transmitters to the appliance. Wireless doorbells or chimes are a good example of the later problem where signals transmitted by wireless doorbell buttons (attached to the exterior walls of buildings) often could not be received and/or were interfered with by the constructional composition and/or structure of the walls to which they were attached. Hence, these signals could not be received by the chime unit, or if they were received, were unusable by the chime unit due to degradation in signal quality.

Moreover, with respect to wireless door chimes, transmitters and batteries required for the chimes created a unit with less than ideal aesthetics. These items extended out from an outside wall as opposed to being nearly flush or co-planar with the planar surface of an outside wall. The outwardly extended portion of the doorbell button unit created a less than desired aesthetic unit when installed.

As a result of the above-mentioned problems, wireless signals sent by wireless actuators which were intended to activate and/or control an appliance often were not received by the appliance. Units also were created with less than desired attractiveness to consumers. These problems have led to user inconvenience and frustration with these previous systems.

SUMMARY

An apparatus and method are provided whereby portions of a wireless transmitter apparatus are arranged and situated so as to ensure that the wireless signals transmitted by the apparatus will be received by a remotely situated appliance and received in a form that is usable by the appliance. More specifically, an antenna of the apparatus is disposed so as to avoid the interference of structural elements of buildings. In this regard and to take one example, an opening (e.g., hole) can be formed (e.g., drilled) in a structural element (e.g., wall) of the building, and the antenna extended into or through the opening. Consequently, a transmission from the apparatus to an appliance occurs without the interference of the structural element of the building and the signal will be received in a form usable by the appliance. The approaches described herein are easy to use, are aesthetically pleasing, can be retrofitted with existing buildings and appliances, and are easy and cost effective to implement.

The apparatus and method described herein include a transmitter apparatus effective for activating a remotely situated appliance. The transmitter apparatus includes a transmitter actuator and a radio frequency (RF) transmitter. The radio frequency (RF) transmitter includes RF transmission circuitry and an antenna. The RF transmitter is configured to be mounted to a structural element of a building and configured to receive an actuation by a user to wirelessly transmit a signal. An antenna is coupled to the RF transmitter circuitry and is arranged and configured to transmit the signal to a remotely situated appliance. The antenna is disposed within an opening in the structural element of the building and is of dimensions so as to extend at least partially through the opening. The antenna transmits the signal to the appliance without significant interference or absorption from the structural element of the building.

In some of these examples, the RF transmitter further includes a power source and the power source is disposed so as to be accessible to the user without removing the RF transmitter from its mounted position.

The antenna can be also structured in any number of ways. For example, the antenna may be a wire or a printed circuit board (PCB) antenna. Other examples of antennas are possible. When a wire is used, the length (or other characteristics) of the wire may be selected so that the wire extends through the opening and, hence, beyond the structural element of the building.

In still others of these examples, the transmitter may include a housing with the antenna being disposed within the housing. In some examples, the housing is generally cylindrical in shape.

Further, the transmitter and transmitter circuitry may be secured to various structural elements of buildings according to the present approaches. For example, the transmitter may be secured to exterior walls, interior walls, or barriers (e.g., doors). Other structural elements may also be used.

The remotely situated appliance may also be a variety of different devices. For example, the remotely situated appliance may be a doorbell, a light; an intercom, a fan, an alarm system, a moveable barrier operator, a window treatment, a rolling shutter, a hot tub, a fireplace, a television, or a video source. Other examples of appliances are possible.

The transmitter may be coupled to a number of different actuators. For example, one or more buttons may be included. In some examples, the one or more buttons are illuminated.

In others of these approaches, a transmitter is mounted to an exterior surface of a building and the transmitter including the transmission circuitry and the antenna. An opening is formed in the building and the opening extends at least partially through a structural element of the building. The antenna is disposed within the opening. The transmitter may be actuated and responsively transmit a radio frequency (RF) signal to the remotely situated appliance via the antenna. The signal being transmitted to the appliance is received at the appliance without significant interference or absorption from the structural element of the building.

The opening may be formed according to a variety of different approaches. For example, the opening may be a variety of dimensions, shapes, and sizes, in one example passing completely through a wall of the building. In other examples, the opening may only pass partially through the wall. In still other examples, the opening is a preexisting opening in the wall and no new opening need be created.

In some examples, the opening extends completely through the structural element of the building and the antenna is disposed so as to completely pass through the opening. In other examples, the hole may extend completely through the structural element, but the antenna may extend only partially through. In still other examples, both the opening and the antenna extend only partially through the structural element of the building.

Thus, approaches are provided where wireless transmitters can be successfully used to activate or otherwise control appliances. These approaches minimize or eliminate the impact of the construction, configuration, or other characteristics of building elements or other potential interference sources. The approaches described herein are easy and cost effective to implement, aesthetically pleasing, and result in the effective operation and/or control of appliances for the user. Consequently, user satisfaction with systems that implement these approaches is significantly enhanced.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DESCRIPTION

Figure 1:
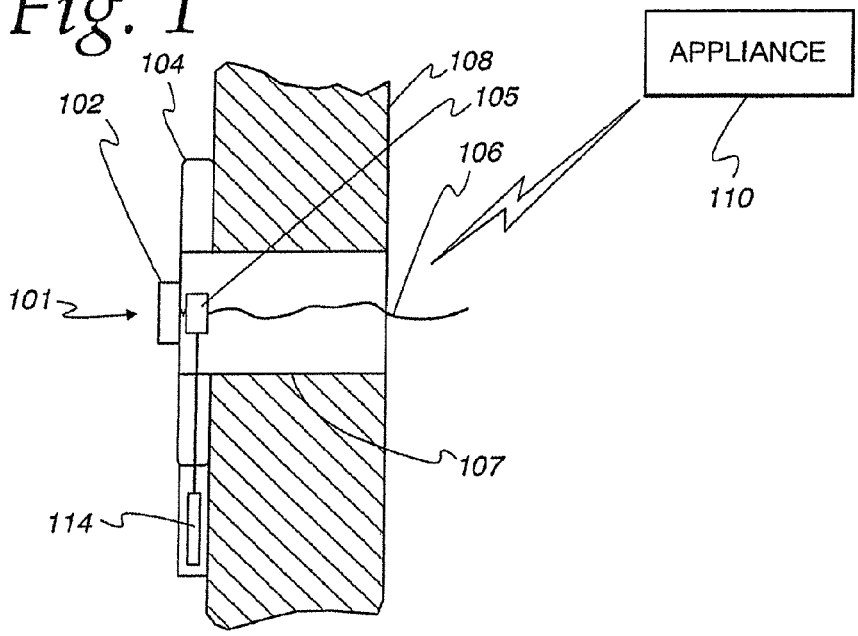
FIG. 1 comprises a side view of a wireless transmission system according to an embodiment the present invention.

Referring now to FIG. 1, one example of a wireless transmission system is described. A transmitter 104 is reactively coupled to an actuator 102 to provide a transmitter apparatus 101. In this example, the actuator 102 is a button. In other examples, the actuator 102 may be a switch, keypad, or rotating wheel. Other examples of actuators are possible. In addition, there may also be more than one actuator 102 (e.g., multiple buttons). In other examples, the actuator 102 may be illuminated by a light or other arrangement disposed within the actuator 102 or the transmitter 104. A decorative plate (not shown) may also surround the actuator 102.

An antenna 106 is coupled to the rear of the transmitter 104. Radio frequency (RF) signals are transmitted from the antenna to an appliance 110. The signals are received by the appliance 110 and may activate and/or otherwise control the operation of the appliance 110.

The antenna 106 may be any antenna structure capable of transmitting radio frequency (RF) signals. In one example, the antenna is a stiff or semi-stiff wire. In other examples, the antenna may be a printed circuit board (PCB) antenna. Other examples of antenna structures are possible.

The appliance 110 may be any of a variety of types of devices. For example, the appliance may be a doorbell (or chime), a light, an intercom, a fan, an alarm system, a moveable barrier operator, a window treatment, a rolling shutter, a hot tub, a fireplace, a television, or a video source. Other examples of appliances are possible. The appliance 110 is remotely situated from the actuator 102, transmitter 104, and antenna 106. That is, the appliance 110 is not coextensive with these elements and is within range of signals transmitted from the antenna 106.

As shown, an opening 107 extends completely through a structural element 108 of a building. The structural element 108 may be any structural component of a building such as an external wall, an internal wall, or a barrier (e.g., door, gate, or the like). Other examples of structural elements are possible. The opening 107 may be formed in any number of ways. For example, a standard drill using a standard drill bit may be used to form the opening (e.g., a hole one inch or less in diameter). Other approaches for forming the opening are possible. In some cases, the opening may be an existing opening.

Additionally, the antenna 106 may be enclosed in a housing (not shown in FIG. 1). In some examples, the housing may be cylindrical in shape and sized to fit into the opening 107. For instance, when a housing is used, the housing may fit in the hole created by standard sized drill bits. In some cases, the housing advantageously allows the antenna to be placed into and/or through the opening 107 without snagging the antenna 106.

The transmitter 104 may include circuitry 105 to receive an actuation from the actuator 102 and convert the actuation into a signal for transmission via the antenna 106. The transmitter 104 and transmitter circuitry 105 are secured to the structural element 108 and the antenna 106 is disposed within the opening 107 (e.g., a drilled hole) in the structural element 108 of a building. In so doing, any interference or absorption of RF signals transmitted by the antenna 106 caused by the structural element 108 of the building (or items attached to or associated with the structural element 108) is substantially reduced or eliminated. In other words, this configuration allows a signal of sufficient quality (e.g., having a sufficient power level or other operating characteristics) to be received and recognized by the appliance 110.

The transmitter 104 may further include and is coupled to a power source 114. In some examples, the power source 114 is a battery. The power source 114 is disposed so as to be accessible to the user without removing the transmitter 104 from its mounted position. For example, the power source 114 may be accessed by a removable cover. In other examples, the power source 114 is only accessible by the transmitter from its mounted position. For example, the whole of the transmitter 104 may need to be removed before the power source 114 can be accessed.

Figure 2:
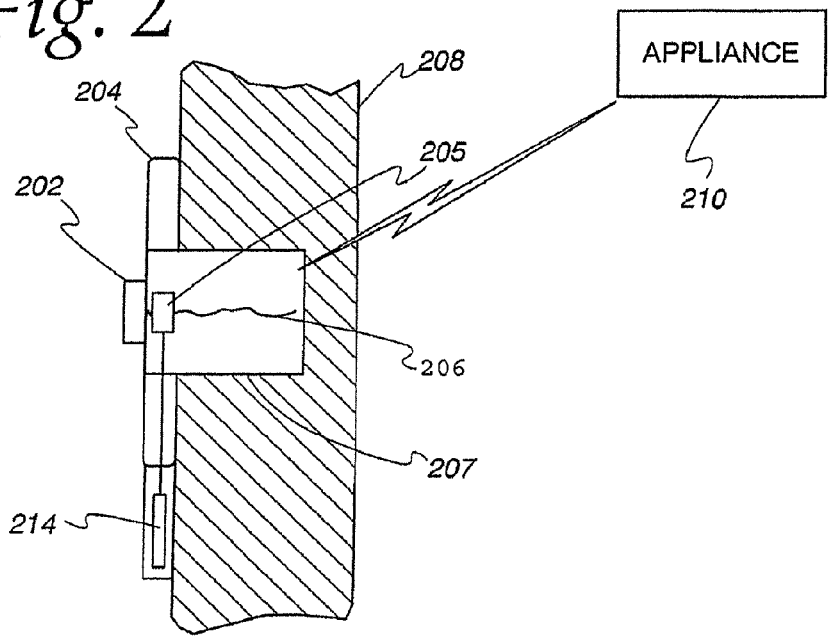
FIG. 2 comprises a side view of a wireless transmission system according to an embodiment of the present invention.

Referring now to FIG. 2, another example of a wireless transmission system is described. A transmitter 204 including circuitry 205 and antenna 206 are coupled to actuator 202. In this example, the actuator 202 is a button. In other examples, the actuator 202 may be a switch, keypad, or rotating wheel. Other examples of actuators are possible. In addition, there may also be more than one actuator 202 (e.g., multiple buttons). In other examples, the actuator 202 may be illuminated by a light or other arrangement disposed within the actuator 202 or the transmitter 204. A decorative plate (not shown) may also surround the actuator 202.

An antenna 206 is coupled to the rear of the transmitter circuitry 205. Signals are transmitted from the antenna to an appliance 210. Radio frequency (RF) signals are received by the appliance 210 and may activate and/or otherwise control the operation of the appliance 210.

The antenna 206 may be any antenna structure capable of transmitting radio frequency (RF) signals. In one example, the antenna is a stiff or semi-stiff wire. In other examples, the antenna may be a printed circuit board (PCB) antenna. Other examples of antenna structures are possible.

The appliance 210 may be a variety of type of devices. For example, the appliance may be a doorbell (or chime), an intercom, a light, a fan, an alarm system, a moveable barrier operator, a window treatment, a rolling shutter, a hot tub, a fireplace, a television, or a video source. Other examples of appliances are possible. The appliance 210 is remotely situated from the actuator 202, transmitter 204, and antenna 206. That is, the appliance 210 is not coextensive with these elements and is within range of signals transmitted from the antenna 206.

As shown, an opening 207 extends partially through a structural element 208 of a building. The structural element 208 may be any structural component of a building such as an external wall, an internal wall, or a barrier (e.g., door, gate, or the like). Other examples of structural elements are possible. The opening 207 may be formed in any number of ways. For example, a standard drill using a standard drill bit may be used to form the opening (e.g., hole one inch or less in diameter). Other approaches for forming the opening are possible. In some cases, the opening may be an existing opening.

Additionally, the antenna 206 may be enclosed in a housing (not shown in FIG. 2). In some examples, the housing may be cylindrical or rectangular, or other shape which is sized to fit into the opening 207. For instance, when a housing is used, the housing may fit in the hole created by standard sized drill bits. In some cases, the housing advantageously allows the antenna to be placed into and/or through the opening 207 without snagging the antenna 206.

The transmitter 204 includes circuitry 205 to receive an actuation from the actuator 202 and convert the actuation into a signal for transmission via the antenna 206. The transmitter 204 is secured to the structural element 208 and the antenna 206 is disposed within the opening 207 (e.g., a drilled hole) in the structural element 208 of a building. In this example, the antenna 206 does not extend completely through the structural element 208. However, in this example this placement is acceptable due to the construction and structure of the structural element 208. For instance, steel or aluminum siding may be present on only one side of the structural element 208 and once the antenna 206 extends beyond this siding, any interference or absorption problems are significantly reduced or eliminated. In other words, a signal of sufficient quality (e.g., having a sufficient power level or other operating characteristics) is received and recognized.

The transmitter 204 is coupled to a power source 214. In some examples, the power source 214 is a battery. The power source 214 is disposed so as to be accessible to the user without removing the transmitter 204 from its mounted position. For example, the power source 214 may be accessed by a removable cover. In other examples, the power source 214 is only accessible by the transmitter from its mounted position. For example, the whole of the transmitter 204 may need to be removed before the power source 214 can be accessed.

Figure 3:
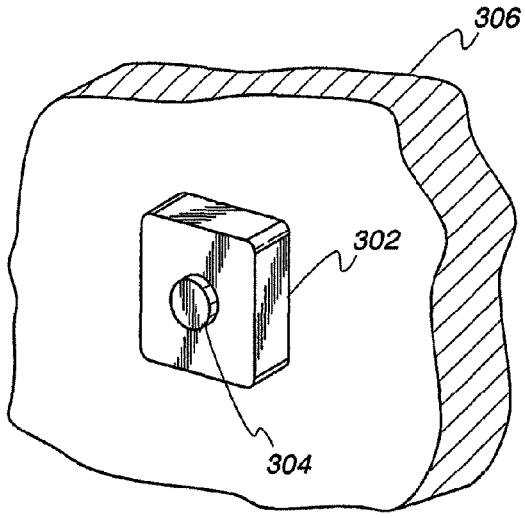
FIG. 3 comprises a perspective view of a wireless transmission system mounted to a structural element of a building according to an embodiment of the present invention.

Referring now to FIG. 3, the placement of a wireless transmission system is described. In this example, the transmitter apparatus which includes transmitter 302 (with an actuator 304) is attached to the surface of a wall 306. An antenna of the transmitter (not shown) extends through a hole in the wall 306 to the other side of the wall 306. In so doing, any interference or absorption of RF signals transmitted by the antenna caused by the wall or items attached to or associated with the wall or structural element (e.g., siding, other electronic devices) is substantially reduced or eliminated.

Figure 4:
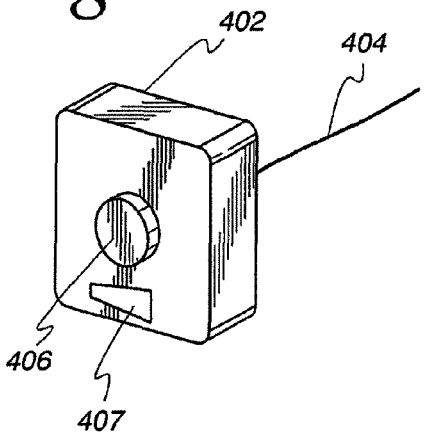
FIG. 4 comprises a perspective view of a wireless transmission system according to an embodiment of the present invention.

Referring now to FIG. 4, an example of a wireless transmission system is described. A transmitter 402 includes an actuator 406 and an antenna 404. In this example, the antenna 404 is a wire. The transmitter 402 includes circuitry to receive an actuation from the actuator 406 and convert the actuation into a signal for transmission via the antenna 404. A removable cover 407 is removed to access a power source (e.g., a battery).

The transmitter 402 is secured to a wall and the antenna 404 is disposed within an opening (e.g., a drilled hole) in a structural element (e.g., a wall) of a building. In some examples, the opening extends completely through the structural element and the wire is of suitable length so as to extend completely through and out of the opening. In so doing, any interference or absorption of RF signals transmitted by the antenna 404 caused by the structural element of the building (or items attached to or associated with the structural element) is substantially reduced or eliminated.

Figure 5:
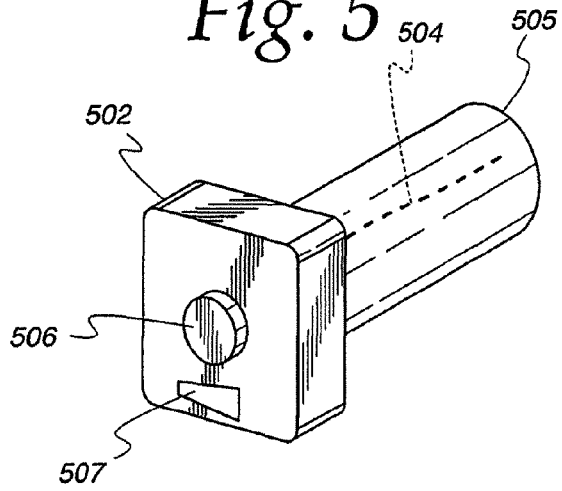
FIG. 5 comprises a perspective view of a wireless transmission system according to an embodiment of the present invention.

Referring now to FIG. 5, another example of a transmission system is described. A transmitter apparatus includes transmitter 502 with its circuitry (not shown), an antenna and an actuator 506. In this example, the antenna 504 is a wire. The antenna 504 is housed in a housing 505. The housing is constructed of a suitable material such as a rigid plastic that does not interfere with or minimally interferes with transmissions made via the antenna 504. A removable cover 507 is removed to access a power source (e.g., a battery). In some examples, the housing 505 is cylindrically shaped and fits within a predrilled hole in the structural element (e.g., wall) of a building. The dimensions of the housing (e.g., its diameter) in some examples are such that it fits within a hole drilled with standard drill bits. In some instances, the housing 505 may advantageously be inserted into the drilled hole without having the antenna 504 snag on or otherwise be encumbered by the sides of the hole.

The transmitter 502 includes circuitry to receive an actuation from the actuator 506 and convert the actuation into a signal for transmission via the antenna 504. The transmitter 502 is secured to a wall and the antenna 504 is disposed within an opening (e.g., a drilled hole) in a structural element (e.g., a wall) of a building. In some examples, the opening extends completely through the structural element and the wire is of suitable length so as to extend completely through and out of the opening. In so doing, any interference or absorption of RF signals transmitted by the antenna 504 caused by the structural element of the building (or items attached to or associated with the structural element) is substantially reduced or eliminated.

Thus, approaches are provided whereby portions of a wireless transmitter are arranged and situated so as to ensure that the wireless signals transmitted by the transmitter will be received by an appliance intended to receive the wireless signals. More specifically, an antenna portion of the transmitter is disposed so as to avoid, reduce, or eliminate the interference of structural elements of buildings. The approaches described herein are easy to use, can be retrofitted with existing buildings and appliances, and are easy and cost effective to implement.

Those skilled in the art will recognize that a wide variety of modifications, alterations, and combinations can be made with respect to the above described embodiments without departing from the spirit and scope of the invention, and that such modifications, alterations, and combinations are to be viewed as being within the scope of the invention.

What is claimed is:

1. A transmitter apparatus effective for activating a remotely situated appliance, the apparatus comprising:

a radio frequency (RF) transmitter which includes radio transmission circuitry and an antenna operably coupled to the transmission circuitry;

a rigid housing comprising a rigid material, the housing configured to hold the transmission circuitry and the antenna, the housing including a battery mounting device to hold a battery to power the RF transmitter;

an actuator operably coupled to the transmitter to effect operation of the transmitter, the housing configured to hold the actuator so that it is operably coupled to the transmitter, the RF transmitter and the housing configured to be mounted to a mounting surface having an RF interfering material associated therewith, the transmitter configured to receive via the actuator an actuation by a user to wirelessly transmit a RF signal to a remotely situated appliance, the antenna being disposed within the rigid housing which is configured to be disposed within an opening in the mounting surface, the housing and the antenna having dimensions so as to extend at least partially through the opening to extend into the mounting surface sufficiently such that the antenna extends beyond the RF interfering material, the antenna transmitting the signal to the appliance to effect control of operation of the appliance without significant interference or absorption from the mounting surface.

2. The transmitter apparatus of claim 1 wherein the battery mounting device is disposed so as to be accessible to the user without removing the RF transmitter from its mounted position.

3. The transmitter apparatus of claim 1 wherein the antenna comprises a wire.

4. The transmitter apparatus of claim 3 wherein the wire is of a length so as to extend through the opening and beyond the RF interfering material associated with the mounting surface.

5. The transmitter apparatus of claim 1 wherein the rigid housing is generally cylindrical in shape.

6. The transmitter apparatus of claim 1 wherein the mounting surface comprises a surface selected from the group consisting of an exterior wall, an interior wall, and a barrier.

7. The transmitter apparatus of claim 1 wherein the remotely situated appliance comprises at least one device selected from the group consisting of a doorbell; an intercom; a light; a fan; an alarm system; a moveable barrier operator; a window treatment; a rolling shutter; a hot tub; a fireplace; a television; and a video source.

8. The transmitter apparatus of claim 1 wherein the transmitter apparatus further comprises at least one actuator button configured to be disposed on a side of the RF interfering material opposite that of at least a portion of the antenna when the transmitter apparatus is mounted on the mounting surface.

9. The transmitter apparatus of claim 8 wherein the at least one button is configured to be illuminated.

10. A method of installing a transmitter apparatus that actuates a remotely situated appliance, the method comprising:

mounting a transmitter to a mounting surface of a building, the transmitter including an actuator, RF transmission circuitry, and an antenna;

inserting a portion of the transmitter into an opening in the building, the opening extending at least partially through a structural element of the building, the structural element having an RF interfering material associated therewith, the opening extending at least partially beyond the RF interfering material associated with the structural element; and wherein the mounting the transmitter comprises inserting a housing supporting the antenna at least partially through the opening and past the RF interfering material associated with the structural element relative to the actuator.

11. The method of claim 10 further comprising:

actuating the transmitter to responsively transmit a radio frequency (RF) signal from the transmitter to the remotely situated appliance via the antenna, the signal being transmitted to the appliance without significant interference or absorption from the structural element of the building.

12. The method of claim 10 further comprising forming the opening by drilling a hole completely through a wall of the building.

13. The method of claim 12 wherein the opening extends completely through the structural element of the building and inserting a portion of the transmitter into the opening includes disposing the antenna so as to completely pass through the opening.

14. The method of claim 10 wherein the transmitter includes a power source and further comprising accessing the power source without removing the transmitter from its mounted position.

15. The method of claim 10 wherein the remotely situated appliance comprises at least one device selected from the group consisting of a doorbell; a light; an intercom; a fan; an alarm system; a moveable barrier operator; a window treatment; a rolling shutter; a hot tub; a fireplace; a television; and a video source.

16. The method of claim 10 wherein the structural element of the building comprises an element selected from the group consisting of: an exterior wall, an interior wall, and a barrier.

17. A transmitter apparatus effective for activating a remotely situated appliance, the apparatus comprising:

an actuator configured to be mounted on a mounting surface of a building;

a radio frequency (RF) transmitter apparatus, the RF transmitter apparatus electrically connected to the actuator and configured to be mounted to the mounting surface of the building and further configured to receive an actuation by a user acting on the actuator to wirelessly transmit a RF signal, the RF transmitter apparatus comprising:

a housing which includes a housing portion, the housing configured to be mounted on the mounting surface of the building;

RF transmission circuitry within the housing;

a power source compartment configured to be accessible to a user without removing the RF transmitter apparatus from a mounted position on the mounting surface of the building; and an antenna disposed in the housing portion, the housing portion comprising a rigid material, the housing portion configured to structurally support at least a portion of the antenna generally orthogonal to the mounting surface, the antenna being electrically coupled to the RF transmission circuitry, the antenna being arranged and configured to transmit the signal to a remotely situated appliance, the antenna configured within the housing portion so as to extend through the housing portion and an opening in the mounting surface of the building, the antenna transmitting the RF signal to the appliance to effect control of the operation of the appliance without significant interference or absorption from the mounting surface of the building.

18. The transmitter apparatus of claim 17 wherein the antenna comprises a wire.

19. A transmission apparatus comprising:

an actuator for receiving a user activation; and a radio frequency (RF) transmitter for activating a remotely situated appliance in response to the user activation, the RF transmitter mountable to a mounting wall with a metal structure incorporated therein, the RF transmitter having:

an antenna structurally supported within a housing, the antenna and the housing configured to be disposed within an opening at least partially through the mounting wall and past the metal structure of the mounting wall relative to the actuator; and transmission circuitry electrically connecting the actuator, a power source, and the antenna.

20. A method of installing a transmission apparatus onto a mounting wall having a metal structure incorporated therein, the method comprising:

forming an opening in the mounting wall, the opening extending beyond the metal structure incorporated into the mounting wall; and mounting a transmission apparatus to the mounting wall, the transmission apparatus comprising an actuator, a radio frequency (RF) transmitter, and an antenna structurally supported in a housing;

wherein mounting the transmission apparatus includes disposing at least a portion of the antenna into the opening in the mounting wall beyond the metal structure incorporated into the mounting wall and disposing the actuator on a side of the metal structure opposite a portion of the antenna that extends beyond the metal structure.

21. The method of claim 20 wherein the opening in the mounting wall extends partially through the mounting wall and at least beyond the metal structure incorporated into the mounting wall.

22. A transmitter apparatus effective for activating a remotely situated appliance, the apparatus comprising:

a radio frequency (RF) transmitter comprising radio transmission circuitry and an antenna operably coupled to the transmission circuitry;

a housing with at least one housing wall, the antenna being disposed within the housing and the housing configured to retain the antenna generally orthogonal to the at least one housing wall;

an actuator operably coupled to the RF transmitter to effect operation of the transmitter in response to actuation of the actuator;

the RF transmitter and the housing configured to be mounted to a mounting wall having an RF interfering material associated therewith, the transmitter configured to wirelessly transmit an RF signal to a remotely situated appliance in response to actuation of the actuator, the antenna being enclosed within the mounting wall and a portion of the antenna extending into the mounting wall sufficiently such that the antenna extends beyond the RF interfering material, the antenna configured to transmit the signal to the appliance to effect control of operation of the appliance without significant interference or absorption from the mounting wall.

* * * * *

UNITED STATES PATENT AND TRADEMARK OFFICE

CERTIFICATE OF CORRECTION

PATENT NO. : RE44,745 E
APPLICATION NO. : 13/796088
DATED : February 4, 2014
INVENTOR(S) : Scott B. Tylicki, Jimmy David Claiborne and Timothy Gale Birdwell It is certified that error appears in the above-identified patent and that said Letters Patent is hereby corrected as shown below:

TITLE PAGE:

Item (73) Assignee: Change "HealthCo LLC" to -- HeathCo, LLC --.

Signed and Sealed this
Eighth Day of July, 2014

Michelle K. Lee

Michelle K. Lee
*Deputy Director of the United States Patent and Trademark Office*